July 12, 1955
V. C. BELT
2,712,869
ADJUSTABLE UNDER-CARRIAGE CONSTRUCTION
FOR PORTABLE CONVEYORS
Filed April 25, 1952
3 Sheets-Sheet 1
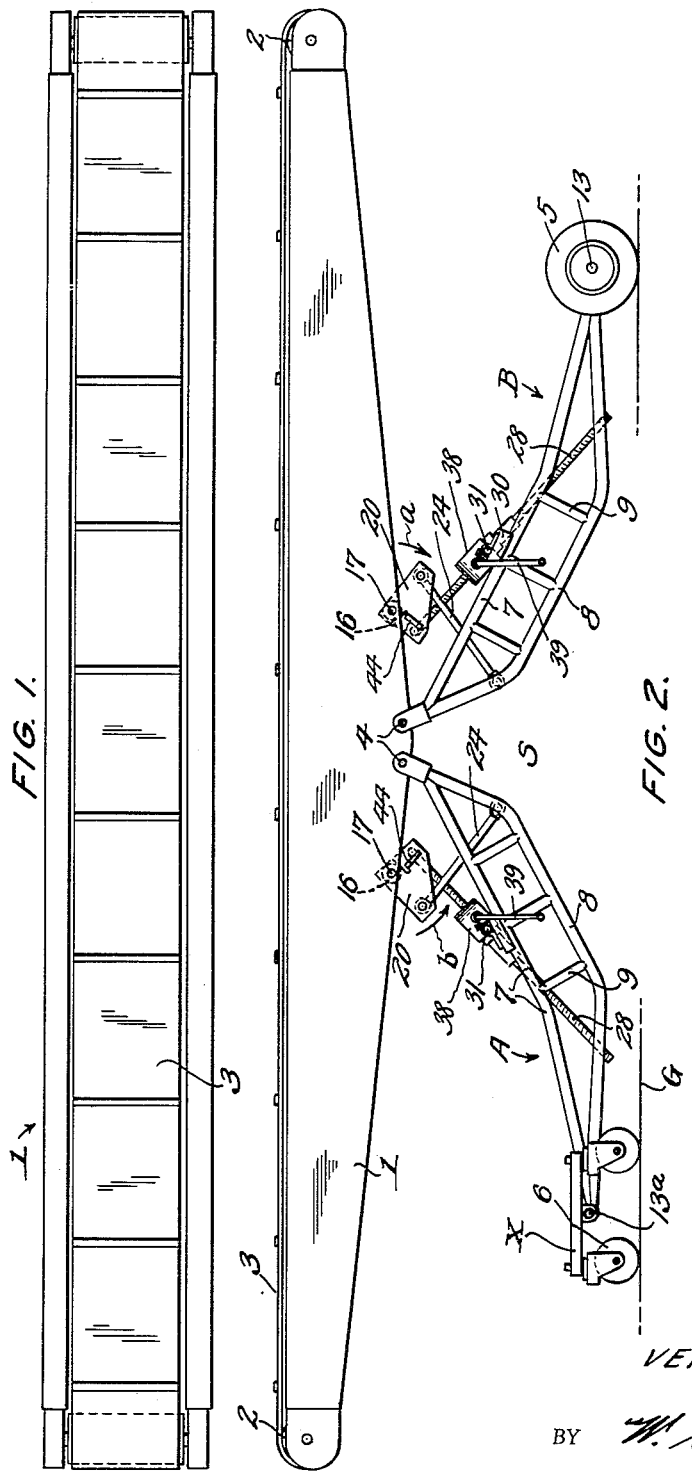
INVENTOR
VERNON C. BELT
BY *W. N. McDowell*
ATTORNEY

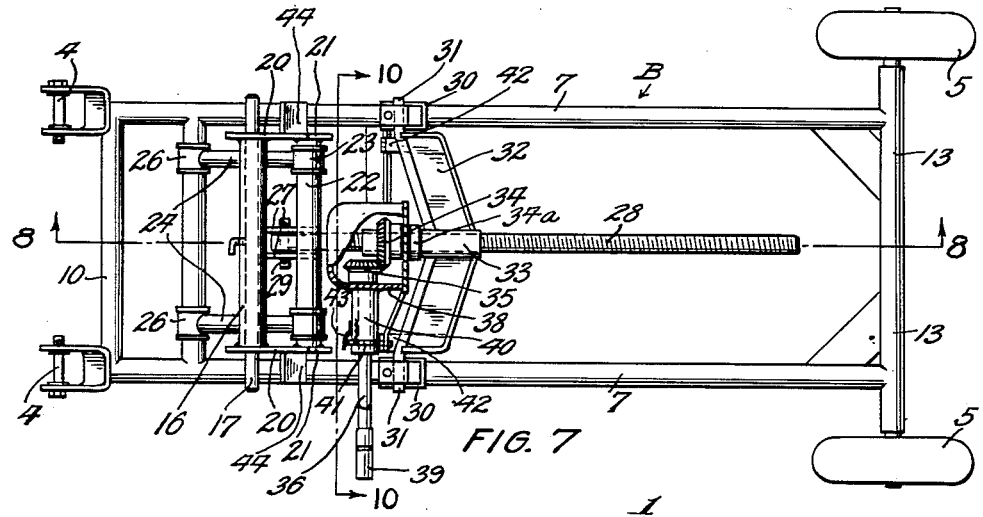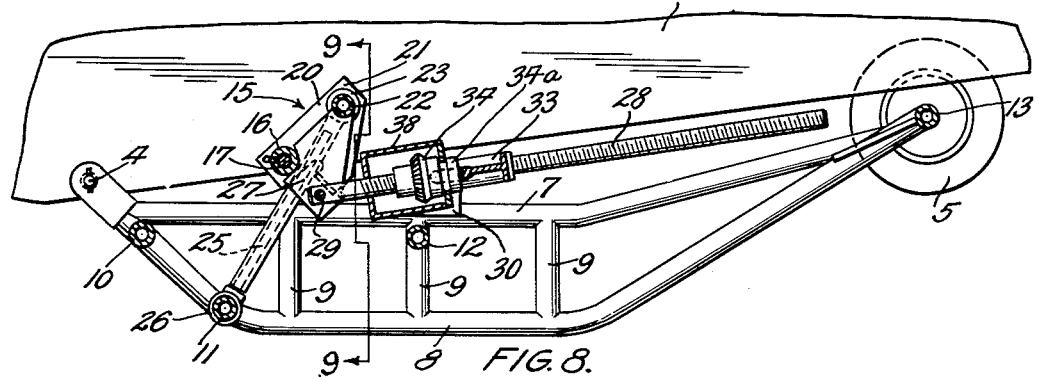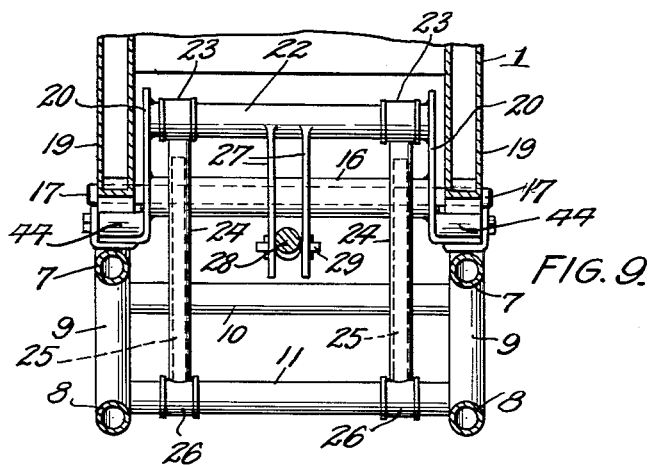

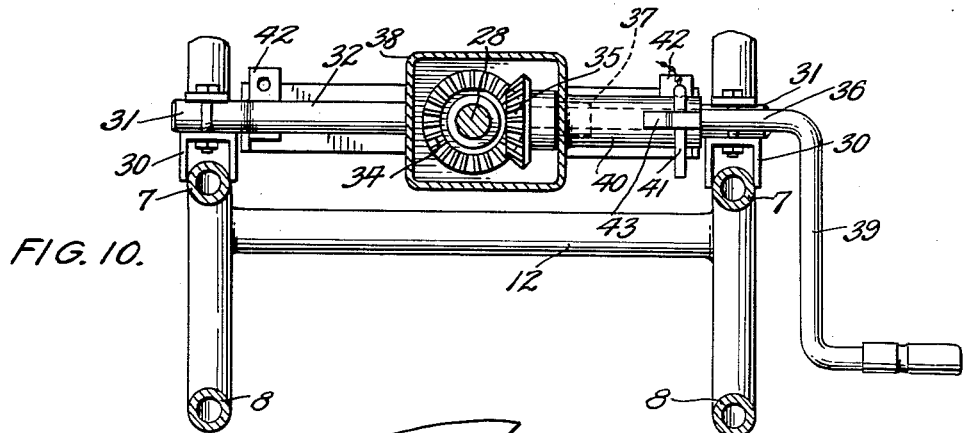
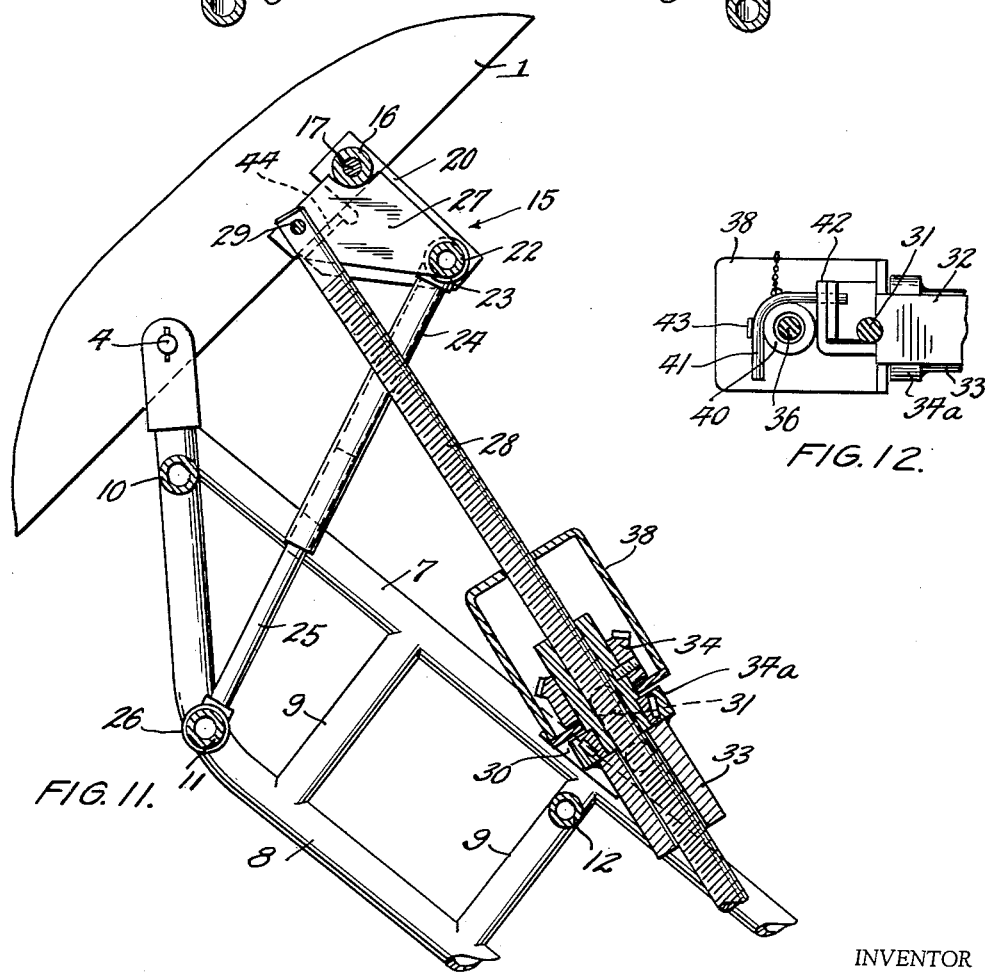

United States Patent Office 2,712,869
Patented July 12, 1955

2,712,869

ADJUSTABLE UNDER-CARRIAGE CONSTRUCTION FOR PORTABLE CONVEYORS

Vernon C. Belt, Orient, Ohio, assignor to The Belt Corporation, Orient, Ohio, a corporation of Ohio Application April 25, 1952, Serial No. 284,394

12 Claims. (Cl. 198—118)

This invention relates to portable loading conveyors of the power-driven endless belt type which are adapted to be employed as mechanical aids in the rapid transfer, elevation and loading of various products contained in boxes, packages or loose bulk form.

Such portable loading devices embody conventionally a wheeled under-carriage which is employed in effecting the support of an elongated, longitudinally extending frame wherein is mounted a motor-driven product-receiving and moving endless belt. Normally, such portable loader mechanisms provide a means to adjust bodily the elongated belt frame to cause the same to assume different elevations and operating positions angular with respect to the vertical, whereby to transfer the products handled by the loader between lower and higher planes of reception and discharge.

It is an object of the present invention to provide a portable loading machine in which an improved under-carriage structure is provided for the adjustable support of the belt-carrying frame of the machine, and wherein said structure embodies a pair of cooperative units employed normally in supporting the belt frame and facilitating its adjustment in causing it to assume various positions of operation.

Another object of the invention is to provide an under-carriage structure for portable loading machines which includes an improved raising and lowering mechanism for adjustably uniting the under-carriage of such a machine with the belt frame thereof, the mechanism functioning in a manner causing the frame to be easily and conveniently operated in assuming various operating positions.

A further object of the invention is to provide an improved under-carriage for portable conveyors in which the undercarriage involves a frame pivotally connected at one end with an associated conveyor frame intermediately of the length of the latter, and wherein the opposite portion of the under-carriage frame is provided with base-engaging wheels, the frame of the under-carriage and the frame of the conveyor being united by an improved system of linkage so formed and arranged that it may be readily operated to move and retain the conveyor frame in its various positions of adjustment with respect to the under-carriage.

In conveyors or loaders of this nature, the vertical and angular adjustment of the often heavy and cumbersome conveyor frames relative to their supporting bases or under-carriages, has been performed by a variety of different mechanisms. Most of these mechanisms have been characterized by the physical difficulties which they almost invariably offer to ease and convenience in the necessary manipulation thereof in securing variations in operating positions of the conveyor frames or units. Particularly such prior mechanisms when substantial adjustments of the conveyor frames are required include toggle lever systems, pivoted links and other arrangements which, when adjustment thereof is first initiated, require the exertion of maximum physical effort on the part of the operators in effecting the same. Therefore, one of the objects of the present invention is to provide an under-carriage supported lever system for adjusting loading conveyors in which the initial stages of adjustment from a primary low position toward elevated or raised positions is characterized by the ease with which such adjustments may be manually executed.

Other objects are to provide in a loading machine of the character indicated a raising and lowering mechanism adjustably uniting the under-carriage and conveyor units, and wherein the mechanism includes an elongated longitudinally extending thrust screw having one end thereof pivotally connected with an oscillatory lever system carried by the conveyor unit and joined with the under-carriage unit by a telescopic connection; to provide a mechanism of this type in which the thrust screw of the conveyor raising and lowering mechanism is supported by oscillatory members mounted in connection with both the under-carriage and conveyor units; to provide a thrust screw in apparatus of this character which in all its operating positions of longitudinal and oscillatory adjustment does not touch the ground, and to provide mechanism generally which constitutes an improvement over prior apparatus of an analogous nature.

For a further understanding of the invention, reference is to be had to the following description and the accompanying drawings, wherein:

Fig. 1 is a top plan view of a portable loading machine in which is incorporated the structural features of the present invention;

Fig. 2 is a side elevational view of the machine;

Figs. 3 to 6, inclusive, are diagrammatic views disclosing various positions of adjustment which the conveyor frame of the improved loading machine of the present invention may assume with respect to its under-carriage supporting units;

Fig. 7 is a plan view of one of the under-carriage units;

Fig. 8 is a vertical longitudinal sectional view on the line 8—8 of Fig. 7;

Fig. 9 is a vertical transverse sectional view taken on the plane indicated by the line 9—9 of Fig. 8;

Fig. 10 is a transverse sectional view on the line 10—10 of Fig. 7, disclosing the shiftable manually operated means for actuating the kinematic linkage of the apparatus;

Fig. 11 is an enlarged detail vertical sectional view taken through the linkage;

Fig. 12 is a detail sectional view showing the means for retaining the hand-operated crank shaft one side or the other of the carriage unit frame.

Referring more particularly to the drawing, the numeral 1 designates a relatively narrow and elongated belt or conveyor frame of my improved portable loader. The frame carries guide and drive rolls 2 at the opposite ends thereof around which pass an endless belt 3. The latter is adapted to be suitably driven by a frame-carried motor, not shown, whereby to impart longitudinal movement to the belt in the longitudinal advance of products handled by the loader along the frame 1.

The frame is adapted to be supported for convenient portable movement over a horizontal base or floor surface by an under-carriage structure, indicated at S. In this instance, the structure consists of the cooperative units A and B. Each of these units has its inner and normally upper end pivotally connected as at 4 to the lower intermediate portion of the frame 1 on opposite sides of the latter, while the normally lower or outer end of each of the units A and B carries ground-engaging wheels 5. In the unit B, a single pair of the wheels 5 is utilized, as shown more particularly in Figs. 2 and 7, whereas in the unit A the wheels 6 consist of a set of four casters carried by a dolly frame X. With the under-carriage and belt frame positioned, as shown in Figs. 2, 3, 4 and 5 of the drawings, the units A and B operate jointly or collectively in effecting the support of the belt frame 1, wherein in Fig. 6 but one of said units is used in the support of the belt frame, in this instance the unit A.

Each of the units A and B of the under-carriage structure S comprises a sled-like frame, consisting of rigidly united lengths of metal tubing or the like. Each frame is formed to comprise a pair of upper members 7 and a pair of lower members 8, said upper and lower members being joined by longitudinally spaced vertical brace members 9 and transversely and horizontally extending brace members indicated at 10, 11 and 12. Also at their outer or lower ends the units A and B are provided with cross members shown at 13 and 13a. In this instance, the cross member 13 of the forwardly located unit B is provided with a pair of relatively large-diametered ground wheels 5, while the corresponding cross member 13a of the unit A is pivotally connected with the center of the dolly frame. It will be noted that the members 7 and 7 of the under-carriage frames include parallel portions which, as indicated in Figs. 3 and 8, are capable of assuming substantially horizontally positions in which each under-carriage frame may be caused to rest directly on the ground or floor surface, so that the function of supporting the belt frame of the conveyor is borne directly by the under-carriage rather than by their ground-engaging wheels 5 and 6. With the under-carriage units in direct contact with the ground or floor surface the height of the machine is minimized for certain use conditions, or for storage or shipping.

In order to control the tilting of the elevator frame in enabling it to assume the different operating positions, as depicted in Figs. 2 through 6 of the drawings, use is made of an oscillating lever system 15 for uniting the frames of the under-carriage units with the frame of the loader belt. In each of the units A and B of the under-carriage structure, the lever system comprises a transversely extending tubular member 16 disposed in the bottom central portion of the frame 1. Extending through the tubular member is a shaft 17 which has its ends supported in suitable bearings carried by the lower edges of the side members 19 of the frame 1.

Welded or otherwise connected with the ends of the tubular member 16, in order to form a unitary part thereof, are spaced depending outer plates 20, the latter serving as crank extensions, projecting from the opposite ends of the member 16 to oscillate about the axis of the shaft 17. The plates 20 act somewhat in the capacity of bell crank levers, and the ends 21 thereof carry a tubular cross member 22, which constitutes a unitary part of the lever assembly provided by the plates 20.

The sleeves shown at 23, which are loosely rotatable on the ends of the cross member 22, carry fixed tubes 24 in which are telescoped rods 25, the latter being carried by sleeves 26 which are rockable on the cross members 11 of each of the carriage frames.

The tubular member 22 is formed centrally of its length with spaced depending inner plates 27. To the outer or lower ends of the plates 27 there is pivotally but non-rotatably fastened the inner end of a longitudinally extending thrust screw 28 which is used in connection with each of the carriage units, the pivotal connection between the inner end of each of the screws 28 and the plate extensions 27 being indicated at 29.

Each carriage frame has the members 7 thereof provided with bearing blocks 30, the latter being formed with bearing slots for the reception of fulcruming trunnions 31 which project from the ends of an oscillatory screw-supporting yoke 32. Each of these yokes include a longitudinally extending sleeve 33 in which the associated screw 28 is supported for longitudinal sliding movement when the screw is actuated to produce rocking movement of the plates 20.

Rotatably carried by the screw 28 and coacting with the sleeve 33 is a bevel gear 34. The hub sleeve of this gear is formed with an internally threaded bore adapted to receive the external threads of the screw 28 associated with the gear. Positioned between the hub of the gear 34 and the adjoining end of the sleeve 33 is an end thrust bearing 34a. This construction is such that when rotation is imparted to the gear 34, its position in relation to the carriage frame will be maintained, but longitudinal back and forth movement will be imparted to the screw 28, depending upon the direction in which the gear 34 is rotated.

To effect rotation of the gear the teeth thereof mesh with a similar gear 35 which is carried by the inner end of a manually operated crank-equipped shaft 36. The upper horizontal portion of the shaft 36 is journaled in a bearing 37 carried by a housing member 38 which is turnable about the longitudinal axis of the shaft 28 on the hub sleeve of the gear 34. Additionally, this construction is such that the crank handle 39 thereof may be swung from one side to the other of the under-carriage frame in which it is mounted. The housing member 38 includes a sleeve extension 40 in which the shaft 36 is rotatably mounted, the sleeve extension 40 turning with the housing 38 about the longitudinal axis of the thrust screw.

To retain positively the crank-carrying sleeve extension 40 on one side or the other of the carriage frame on which it is mounted, use is made of a right angularly bent rod 41. This rod has one of its ends removably received in an opening formed in a bracket 42 carried at each end of the yoke 32. The other part of the rod 41 is received within a spring-pressed clip 43 carried by the sleeve 40. By withdrawing the pin or rod 41 from association with the spring clip, the entire handle structure may be swung about the axis of the screw 28 to the other side of the carriage and secured in the same manner.

The operating handles of the crank shafts are placed in sufficiently close relative order so that the same may be engaged by the hands of a single operator. It is not necessary normally that both handles be turned at the same time, since one handle may be rotated and then the other in producing the desired actuation of the raising and lowering mechanism.

In operation, assuming that the machine occupies its extreme lowered position, as when viewed in Figs. 3 and 8, and it is desired to elevate the conveyor unit 1 to the position of Fig. 2, or that of Figs. 4 and 5, the operator turns the crank handle 39 of both under-carriage units A and B. In Fig. 3, the carriage units are shown as resting directly on the ground. When the crank handles are initially rotated thrust movement inwardly is imparted to the screws 28. This movement is then imparted to the swinging lever assembly 15 of each carriage unit, which turns about the axis of its conveyor shaft 17, the screw shaft construction enabling the lever assembly to turn easily. This swinging movement is imparted to the telescopic connections 24 and 25, producing downward thrust by said connections on their associated carriage units and reacting upward thrusts on the conveyor frame through pivot connections 17. These forces impart lifting movement to the conveyor frame and at the same time swinging the outer wheel-carrying ends of the carriage units downwardly due to the bodily turning movement of the units about their pivoted connection 4 with the conveyor frame.

This turning movement of the lever system 15 of each carriage unit is continued until the wheels 5 and 6 contact the ground. This action is continued with the wheels rolling on the ground until the desired elevation of the conveyor frame has been obtained.

Reverse inclination of the conveyor 1 may be obtained so that such conveyor may be adjusted to assume the angle of Fig. 5. Under extreme conditions, as shown in Fig. 6, the unit B may be disconnected from the conveyor frame and reliance placed on the single unit A. Normally, however, both units are cooperatively used in obtaining the various working positions illustrated in Figs. 2 through 5 and various intermediate positions on the part of the machine.

As shown more particularly in Figs. 8 and 11, the plates 20 may be provided with laterally directed lugs 44 which when said plates are swung to assume an extreme position, as indicated in Fig. 11, contact with the lower edges of the conveyor frame sides and receive the direct thrust of the screw 28 in turning the conveyor bodily about the axis provided by the pivotal mounting 4. After the lugs 44 have been brought into engagement with the underside of the conveyor frame to lift the latter, the telescopic elements 24 and 25 separate so that the entire conveyor-lifting function is assumed by the lugs 44, as shown in Fig. 11.

In view of the foregoing, it will be seen that the present invention provides a sturdy lightweight portable loading machine in which the belt frame of the conveyor may be readily adjusted to assume different working levels and angular planes, whereby to adapt the loader most advantageously to the various operations which in use is called upon to perform. In any of its operating positions, the under-carriage structure S and the oscillating lever system will lock or positively maintain the belt frame against accidental loss of position. This lever system may be readily operated through the manually rotated shafts which may be positioned so that they will be accessible from either side of the machine, the shifting of the actuating controls enabling the machine to be placed in close relationship to vertical walls or in other inaccessible locations.

In all positions it will be noted that the thrust screw 28 will be maintained in such supported positions that it does not contact the ground and thereby interfere with position adjustments. Due to the arrangement shown, the initial lifting forces produced in the elevation of the conveyor frame are easy to effect, even though the thrust screw occupies a substantially horizontal position, since the plates are swung downwardly on the direct thrust telescopic connections 24 and 25, producing upward movement of the reacting conveyor frame.

While I have set forth and described in detail certain preferred embodiments of the present invention, nevertheless it will be understood that the invention is subject to certain other mechanical variation or modification without departing from the spirit of the invention or the scope of the following claims.

I claim:

1. In a portable loading machine having an elongated conveyor, an under-carriage for the adjustable support of said conveyor, said under-carriage embodying a pair of frames, each of said frames including a longitudinal extending body portion which with respect to said conveyor is terminated at opposed ends thereof in laterally directed extensions disposed in angular relationship to the body of each frame, ground-engaging wheel means carried by the outer ends of said frames, means pivotally connecting the inner angularly extending ends of said frames in adjoining but longitudinally spaced order to said conveyor intermediately of the length of the latter, and kinematic linkage pivotally uniting intermediate portion of said frames with said conveyor outwardly and on opposite sides of the pivotal means joining the inner ends of said frames with said conveyor, the angularity of the outer ends of said frames and the adjustment provided by said linkage serving to admit of the adjustment of the frames between working positions in which the body portions of the frames engage directly with the ground surface in supporting said conveyor with the wheel means on the outer ends of said frames spaced above said ground surface, and extreme positions of tilt of the conveyor in which the latter is disposed in acute angular relationship with respect to a horizontal ground surface.

2. In a portable loading machine, an elongated longitudinally extending conveyor, an under-carriage structure for said conveyor, said structure embodying a pair of oppositely facing frame units, each of said units including a longitudinally extending body portion which terminates with respect to said conveyor in angularly disposed inner and outer ends, adjacently disposed means pivotally uniting in longitudinally spaced order the inner ends of said frame units with an intermediate portion of said conveyor, ground engaging wheels rotatably carried by the outer ends of said frame units, and pivoted compound linkage joining an intermediate portion of each of said frame units with said conveyor outwardly of and on opposite sides of the pivotal connections between the inner ends of said frame units and said conveyor, said linkage serving to adjust said frame units to positions in which the body portions of the frame units engage a ground or base surface in effecting the support of said conveyor and with the wheels on the outer ends of said frame units withdrawn from surface contact, said linkage further serving to provide for independent rocking action of said frame units in controlling the angularity of the conveyor when in operation with respect to a horizontal plane.

3. In a portable loading machine, an elongated longitudinally extending conveyor, an under-carriage structure embodying a pair of oppositely facing frame units, each of said units having inner and outer end-forming extensions disposed in angular relation to the central body portions of said frame units, ground engaging wheels carried by the outer of said extensions, pivotal means uniting the inner extensions in adjacent but longitudinally spaced relationship to a central portion of said conveyor, compound linkage pivotally uniting intermediate body portions of each of said frame units with said conveyor on opposite sides of the pivotal means uniting the inner end extensions of said frame units with said conveyor, the linkage of each of said frame units being independently operable with respect to the linkage of the other of said frame units, said linkage serving to effect such relative adjustment between the frame units and said conveyor as to cause said frame units to support the conveyor with the wheel means on the outer end extensions of said frame units raised from the ground, or with the wheel means in engagement with the ground and the conveyor moved to planes of operation angular with respect to the horizontal.

4. An under-carriage structure for a portable loader of the type having an elongated conveyor bed, said structure embodying a pair of cooperative units arranged beneath said bed, each unit including a body formed for conveyor-supporting engagement with the ground and having with respect to the conveyor bed inner and outer angularly directed upturned end extensions, ground-engaging wheel means provided on the outer end extension, pivotal means directly uniting the inner end extension of each unit body with the under portion of the conveyor bed intermediately of the length of the latter, unitary crank members pivotally carried by said bed intermediately of the length of the latter, thrust members uniting said crank members with said units, and manually operated shaft means for rocking the crank member of each under-carriage body to provide for independent adjustment of each body.

5. An under-carriage for portable loading machines of the type embodying an elongated conveyor bed arranged above an under-carriage, comprising: a longitudinally extending carriage frame formed with respect to an associated conveyor bed with parallel upper and lower members united by rigid horizontally and vertically disposed brace members, said lower members when said carriage frame is in one position of operation having direct contact with the ground surface in supporting an associated superposed conveyor bed thereon, said carriage frame terminating with respect to said bed in inner and outer longitudinally directed extensions disposed in upwardly diverging angular relation to the frame, wheel means mounted on the extreme outer part of said outer extension, said wheel means when said lower frame members are in contact with the ground being disposed above the ground, means pivotally uniting said inner extension to the associated conveyor bed intermediately of the length of the latter in a manner providing for bodily swinging movement of said under-carriage about a substantially horizontal axis, adjustable screw-actuated crank members pivotally joined with said carriage frame and conveyor bed to control the vertical and angular working positions of the conveyor bed with respect to the horizontal, means pivotally uniting said crank members with said conveyor bed at positions spaced outwardly and longitudinally from the pivotal means employed in uniting the carriage frame inner extension with said conveyor bed, and thrust members pivotally united with said crank members and with the lower members of said carriage frame.

6. An under-carriage structure for portable loading machines of the type embodying elongated conveyor beds, said structure comprising: a frame-forming body adapted for disposal beneath an associated conveyor bed and provided with inner and outer ends, wheel means mounted on the outer end of said body, pivotal means joining the inner end of said body with an associated conveyor bed intermediately of the length of the latter, said pivotal means providing for bodily swinging movement of the frame-forming body about a substantially horizontally disposed axis, intermediate portions of the body being formed so that when said body is in one position of operation the same rests directly on a ground surface in supporting the conveyor bed with said wheel means elevated above the ground, and when said body is turned about said horizontal axis to elevate the conveyor bed said wheel means only of the under-carriage engages the ground, adjustable screw-actuated crank means pivotally joining said body with said conveyor bed to control the operating positions of the latter with respect to the under-carriage, means pivotally connecting said crank means with an under and intermediate part of the conveyor bed, and telescopic thrust means pivotally united at one end with said crank means at positions spaced outwardly and longitudinally from the pivotal axis thereof and at its other end with said body at positions disposed intermediately of the length of the latter.

7. An adjustable under-carriage for portable loading machines of the type embodying elongated conveyor beds, said under-carriage comprising a body frame formed when in a first position of operation to rest directly on the ground, wheel means carried by one end of said frame and arranged for direct contact with the ground when said frame occupies a second or raised position, an oscillatory crank structure, means supporting said crank structure directly on the under part of the bed of an associated conveyor for rocking movement about a horizontal axis extending transversely of said bed, said crank structure including a journaling shaft carrying unitarily joined intermediate and outer crank extensions, a pair of spaced thrust rods pivotally connected at upper ends thereof with the outer of said crank extensions and at the lower ends thereof with the body of said under-carriage frame, and manually operated shaft means for oscillating said crank structure.

8. An under-carriage structure for raising and lowering the conveyor beds of portable loading machines, comprising: a supporting frame having inner and outer ends, means pivotally connecting the inner ends of said frame with an associated conveyor bed, ground-engaging wheels carried by the outer end of said frame, an oscillatory crank structure, means connecting said crank structure directly with the conveyor bed of an associated loading machine for effecting turning movement of said crank structure about a horizontal axis extending transversely of the conveyor bed, said crank structure including a journalling shaft carrying unitarily joined intermediate and outer crank extensions, a pair of spaced thrust rods connected at their upper ends with said outer extensions and at their lower ends with the frame of said under-carriage, said rods being operable upon turning movement of said crank structure in one direction to produce forces effecting downward swinging movement of the under-carriage frame and upward movement of said conveyor, downward movement of the carriage frame bringing the wheels thereon into thrust-producing contact with the ground, shaft means of constant length pivotally connected with the inner of said crank extensions and with said carriage frame, and manually operated means for imparting longitudinal movement to said shaft means.

9. An adjustable under-carriage for portable loaders having elongated conveyor beds, comprising: an adjustable undercarriage frame carrying ground-engaging wheels at one end thereof, means pivotally uniting an opposite end of said frame with the under part of said conveyor bed to provide for bodily swinging movement of the conveyor bed and the carriage frame about a common substantially horizontal axis, said frame being formed for direct contact with the ground when in one of its conveyor-supporting positions and in which position the ground-engaging wheels at the outer end of the frame are disposed above the ground, adjusting means for swinging said frame and conveyor bed about said axis to bring said wheel means into contact with the ground, said last-named means including a crank structure, means supporting said crank structure on the under side of the conveyor bed for turning movement about a horizontal axis extending transversely of the conveyor and spaced outwardly and longitudinally from the pivotal means uniting the frame with said bed, said crank structure including a fulcruming member carrying unitarily joined inner and outer crank extensions, relatively telescoping thrust rods pivotally connected at one end with the outer of said crank extensions and at the other end thereof with said carriage frame, a screw shaft extending longitudinally of said frame, means pivotally uniting one end of said shaft with the inner of said crank extensions, a cross yoke pivotally connected at its ends with said carriage frame and extending transversely thereof, a rotatable internally threaded member carried centrally by said yoke and in which the screw shaft is non-rotatably received, and manually operated means for rotating said threaded member to impart longitudinal movement to said shaft, said threaded member upon rotation thereof being restrained against longitudinal movement on said shaft by said yoke.

10. Under-carriage structure for portable loading conveyors as defined in claim 9, and wherein the manually operated means for rotating the internally threaded member through which said screw shaft extends is provided with a gear, a second gear in mesh with said first gear, a housing turnable about the axis of said screw shaft and in which said gearing is arranged, a bearing carried by said housing and operable upon turning movement about the axis of said shaft to be arranged on one side or the other of said frame, and a manually rotatable crank shaft journaled in the bearing on said housing for imparting motion to said gears.

11. Under-carriage structure for portable loading conveyors as defined in claim 9, and wherein the manually operated means for rotating the internally threaded member through which said screw shaft extends is provided with a gear, a second gear in mesh with said first gear, a housing turnable about the axis of said screw shaft and in which said gearing is arranged, a bearing carried by said housing and operable upon turning movement about the axis of said shaft to be arranged on one side or the other of said frame, a manually rotatable crank shaft journaled in the bearing of said housing for imparting motion to said gears, and means for retaining said housing and the bearing thereof in fixed positions of adjustment on one side or the other of said frame, and thereby restrain the same against rotation about the axis of said screw shaft.

12. Under-carriage structure as defined in claim 9, and further characterized by the inclusion of shoulder means formed with said outer crank extensions, said shoulder means being engageable with the under part of said conveyor bed following predetermined swinging movement of said crank structure in one direction, whereby to produce movement of said conveyor bed in unison with said crank structure and independently of said thrust-transmitting rods, the extensibility of said telescopic rods providing for movement of said conveyor in unison with said crank structure through the action of said shoulder-forming means and independently of said rods.

References Cited in the file of this patent

UNITED STATES PATENTS

| | | |
|---|---|---|
| 1,261,184 | Taylor, Jr. | Apr. 2, 1918 |
| 1,461,707 | Hanson et al. | July 10, 1923 |
| 2,561,997 | Smith | July 24, 1951 |
| 2,564,333 | Kelly | Aug. 14, 1951 |

FOREIGN PATENTS

| | | |
|---|---|---|
| 392,331 | Germany | Mar. 22, 1924 |